US006528302B2

(12) United States Patent
Turner et al.

(10) Patent No.: US 6,528,302 B2
(45) Date of Patent: Mar. 4, 2003

(54) THIN-WELL MICROPLATE AND METHODS OF MAKING SAME

(75) Inventors: Bruce R. Turner, Exeter, NH (US); David E. Titus, Belmont, MA (US)

(73) Assignee: M.J. Research, Inc., Waltham, MA (US)

( * ) Notice: Subject to any disclaimer, the term of this patent is extended or adjusted under 35 U.S.C. 154(b) by 0 days.

(21) Appl. No.: 10/042,515

(22) Filed: Jan. 22, 2002

(65) Prior Publication Data

US 2002/0151045 A1 Oct. 17, 2002

Related U.S. Application Data

(62) Division of application No. 09/619,116, filed on Jul. 19, 2000, now Pat. No. 6,340,589.
(60) Provisional application No. 60/145,381, filed on Jul. 23, 1999.

(51) Int. Cl.[7] ............................ C12M 1/34; B29C 35/08; B32B 31/16
(52) U.S. Cl. ................................ 435/288.4; 435/305.2; 264/494; 264/496; 156/60; 156/73.1
(58) Field of Search ................. 435/287.2, 288.4, 435/305.2, 305.3; 422/102; 264/459, 464, 477, 478, 494, 496; 156/60, 73.1

(56) References Cited

U.S. PATENT DOCUMENTS

| 4,599,314 A | 7/1986 | Shami ........................ 435/287 |
| 5,096,672 A | 3/1992 | Tervamäki et al. ......... 422/102 |
| 5,514,343 A | 5/1996 | Verwohlt et al. ............ 422/104 |
| 6,015,534 A | 1/2000 | Atwood ....................... 422/102 |
| 6,051,191 A | 4/2000 | Ireland ........................ 422/102 |

FOREIGN PATENT DOCUMENTS

| DE | 40 22 727 A1 | 6/1992 | ............. B01L/3/00 |
| DE | 42 17 868 A1 | 2/1993 | ............. G01N/1/03 |
| DE | 197 39 119 A1 | 11/1999 | ............. B01L/3/00 |
| EP | 0106662 B2 | 4/1984 | .......... G01N/21/03 |
| EP | 0571661 A1 | 12/1993 | ............. B01L/3/00 |

Primary Examiner—David A. Redding
(74) Attorney, Agent, or Firm—Lahive & Cockfield, LLP

(57) ABSTRACT

A thin-well microplate and methods of manufacturing same are provided, wherein the thin-well microplate is conducive for use with automated equipment, such as robotic handling equipment, and in high temperature procedures, such as thermal cycling. The thin-well microplate is constructed of two components including a skirt and frame portion and a well and deck portion with a plurality of sample wells; both portions being joined to form a unitary microplate. Each of the skirt and frame and well and deck portions is constructed of a suitable material that imparts a specific combination of physical and material properties to the thin-well microplate. The skirt and frame portion and the well and deck portion are each constructed of the material that will allow each portion to withstand high temperature conditions and use of automated equipment, while retaining the physical characteristics each portion requires for optimal performance of the thin-well microplate. Such physical characteristics include, although not limited to, rigidity of the skirt and frame portion and thin-walled sample wells of the well and deck portion to permit optimal thermal transfer and biocompatibility. Methods of construction include forming the thin-well microplate as a unitary plate in a single, two-step process, wherein the skirt and frame portion is constructed of a suitable first material in a first step and the deck and frame portion is formed integral with the skirt and frame portion in a second step of a suitable second material. The unitary thin-well microplate plate is thereby formed of two materials for the required specific combination of physical and material properties. Another method of construction includes forming the unitary thin-well microplate in two separate manufacturing processes, wherein the skirt and frame portion is constructed of the first material in a first process and the deck and well portion constructed of the second material in a second process, and the skirt and frame portion and the well and deck portion are, thereafter, permanently joined by an adhesive system to form the unitary plate of the invention.

14 Claims, 10 Drawing Sheets

THIN-WELL MICROPLATE AND METHODS OF MAKING SAME

CLAIM OF PRIORITY

This application is a divisional patent application of U.S. nonprovisional patent application Ser. No. 09/619,116 filed Jul. 19, 2000, issued as U.S. Pat. No. 6,340,589, on Jan. 22, 2002, which claims priority under 35 U.S.C. §119(e) to U.S. provisional patent application Serial No. 60/145,381, filed on Jul. 23, 1999, which are incorporated herein by reference.

FIELD OF THE INVENTION

The invention provides a thin-well microplate having an array of sample wells and a combination of specific physical and material properties required for use with automated equipment, such as robotic handling equipment, to withstand conditions of thermal cycling procedures and provide optimal thermal transfer and biological properties. The invention also provides methods of constructing the thin-well microplate as a unitary plate, employing ideal materials of construction to impart and optimize specific physical and material properties of the thin-well microplate.

BACKGROUND OF THE INVENTION

Various biological research and clinical diagnostic procedures and techniques require or are facilitated by an array of wells or tubes in which multiple samples are disposed for qualitative and quantitative assays or for sample storage and retrieval. Prior art devices that provide an array of wells or tubes capable of containing small sample volumes include microtitration plates that are commonly known as multi-well plates.

Multi-well plates have open-top wells, cups or recesses capable of containing small volumes of typically aqueous samples ranging from fractions of a microliter to hundreds of microliters. Multi-well plates also typically include sample well arrays totaling 96 sample wells that are arranged in an array of 8 by 12 sample wells and have center-to-center well spacing of 9 mm, such as the multi-well plate disclosed in U.S. Pat. No. 3,356,462. Sample well arrays also include arrays of 384 wells arranged in 16 by 24 array with a reduced center-to-center well spacing of 4.5 mm. Well arrays are not limited to any particular number of wells nor to any specific array pattern. For example, U.S. Pat. No. 5,910,287 discloses a multi-well plate comprising a well array of more than 864 wells.

Research techniques that use multi-well plates include, but are not limited to, quantitative binding assays, such as radioimmunoassay (RIA) or enzyme-linked immunosorbant assay (ELISA), combinatorial chemistry, cell-based assays, thermal cycle DNA sequencing and polymerase chain reaction (PCR), both of which amplify a specific DNA sequence using a series of thermal cycles. Each of these techniques makes specific demands on the physical and material properties and surface characteristics of the sample wells. For instance, RIA and ELISA require surfaces with high protein binding; combinatorial chemistry requires great chemical and thermal resistance; cell-based assays require surfaces compatible with sterilization and cell attachment, as well as good transparency; and thermal cycling requires low protein and DNA binding, good thermal conductivity, and moderate thermal resistance.

Different uses of multi-well plates make different demands on the overall form and structure of the multi-well plate. The compatibility of plates with automated equipment is perhaps one of the most stringent constraints on the form and structure of plates. Many laboratories automate various steps or phases of procedures, such as depositing and removing small quantities of reaction mixture from sample wells, often 5 $\mu$l or less, using automated dispensing/aspiration systems. Furthermore, plate handling equipment is often used to help facilitate the automation of such procedures. Accordingly, it is desirable to use a multi-well plate that is conducive to use with robotic equipment and can withstand robotic gripping and manipulation.

Efforts to standardize the features which permit successful deployment of multi-well plates in robotic handling and liquid handling instruments have been recommended (Society of Biomolecular Screening Recommended Microplate Specifications http://sbsonline.com/sbs070.htm), and significant effort has been made to achieve a common geometry of key elements of multi-well plate design, including footprint (defined as length and width at the base plane), well location with respect to the exterior of the footprint, and overall flatness as well as rigidity in the robotic gripping area.

Multi-well plates used in thermal cycling procedures form a sub-set of multi-well plates and may be referred to as thin-well microplates. Use in thermal cycling places additional material and structural requirements on the thin-well microplates. Typically, multi-well plates are not exposed to high temperatures or to rapid temperature cycling. Thin-well microplates are designed to accommodate the stringent requirements of thermal cycling. For example, thin-well microplates typically have design adaptations that are intended to improve thermal transfer to samples contained within sample wells. Sample wells of thin-well microplates have thin walls typically on the order of less than or equal to 0.015 inch (0.38 mm). Sample wells typically are conical shaped to allow wells to nest into corresponding conical shapes of heating/cooling blocks of thermal cyclers. The nesting feature of sample wells helps to increase surface area of thin-well microplates while in contact with heating/cooling blocks and, thus, helps to facilitate heating and cooling of samples.

As described above with respect to standard multi-well plate applications, many laboratories utilizing thin-well microplates now automate procedures performed prior to and subsequent to thermal cycling and employ robotic equipment to facilitate such automation. To ensure reliable and accurate use with robotic instruments, the subset of thin-well microplates must also possess general physical and material properties which facilitate robotic handling as well as enable thin-well microplates to retain their dimensional stability and integrity when exposed to high temperatures of thermal cycling.

Thin-well microplates require a specific combination of physical and material properties for optimal robotic manipulation, liquid handling, and thermal cycling. These properties consist of rigidity, strength and straightness required for robotic plate manipulation; flatness of sample well arrays required for accurate and reliable liquid sample handling; physical and dimensional stability and integrity during and following exposure to temperatures approaching 100° C.; and thin-walled sample wells required for optimal thermal transfer to samples. These various properties tend to be contradictory. For instance polymers offering improved rigidity and/or stability typically do not possess the material properties required to be biologically compatible and/or to form thin-walled sample tubes. Existing thin-well microplates are not constructed to impart all of these properties.

The typical manufacturing process for multi-well plates is polymer injection molding due to the economy of such processes. To insure multi-well plates consistently adhere to specifications for rigidity and flatness, manufacturers of prior art multi-well plates employ one or both of two design options, namely incorporating structural features with multi-well plates and using suitable and economical polymers to construct multi-well plates.

The first option of incorporating structural features with multi-well plates includes incorporating ribs with the undersides of multi-well plates to reinforce flatness and rigidity. However, such structural features cannot be incorporated with thin-well microplates used in thermal cycling procedures. Such structural features would not allow samples wells to nest in wells of thermal cycler blocks and, therefore, would prevent effective coupling with block wells resulting in less effective thermal transfer to samples contained within sample wells.

The second option to enhance rigidity and flatness of multi-well plates includes using suitable, economical polymers that impart rigidity and flatness to the plates. Simultaneously the selected polymer must also meet the physical and material property requirements of thin-well microplate sample wells in order for such sample wells to correctly function during thermal cycling. Many prior art multi-well plates are constructed of polystyrene or polycarbonate. Polystyrene and polycarbonate resins exhibit mold-flow properties that are unsuitable for forming the thin walls of sample wells that are required of thin-well microplates. Molded polystyrene softens or melts when exposed to temperatures routinely used for thermal cycling procedures. Therefore, such polymer resins are not suitable for construction of thin-well microplates for thermal cycling procedures.

Prior art thin-well microplates are also typically manufactured by injection molding processes, wherein the entire microplate is constructed in a single manufacturing operation of a single material, typically polypropylene or polyolefin. Construction of thin-well microplates by injection molding polypropylene is desirable because the flow properties of molten polypropylene allow consistent molding of a sample well with a wall that is sufficiently thin to promote optimal heat transfer when the sample well array is mounted on a thermal cycler block. In addition, polypropylene does not soften or melt when exposed to high temperatures of thermal cycling. However, prior art thin-well microplates constructed of a single polymer resin, such as polypropylene and polyolefin, in a single manufacturing operation possess inherent internal stresses found in molded parts with complex features and exhibit thick and thin cross sectional portions throughout the body of the plate. Internal stresses result from differences in cooling rate of thick and thin portions of the plate body after a molding process is complete. In addition, further distortions, such as warping and shrinkage due to internal stresses, can result when thin-well microplates are exposed to conditions of thermal cycling procedures. Also, the resultant dimensional variations in flatness and footprint size can lead to unreliable sample loading and sample recovery by automated equipment.

Alternative prior art manufacturing methods include thermoforming thin-well multi-well plates from polycarbonate sheet material, such as product number 9332 available from Corning of Corning, N.Y. and product number CON-9601 from MJ Research, Inc. of Waltham, Mass. Thin-well microplates manufactured by thermoforming polycarbonate, however, do not provide the rigidity and dimensional precision required of thin-well microplates for use with robotic equipment, nor the dimensional precision required for accurate liquid dispensing and aspiration by automated sample handling equipment.

Prior art thin-well polycarbonate microplates that have been promoted for robotic applications continue to exhibit dimensional variations associated with thin-well polypropylene microplates. Such thin-well polypropylene microplates thus limit the reliability and precision with which such microplates may be used with robotic equipment. In addition, such thin-well polypropylene microplates require external rigid adaptors to restore dimensional precision, such as Microseal 384 Plate Positioner, product number ADR-3841 available from MJ Research, Inc. of Waltham, Mass. Attempts to increase thin-well microplate rigidity by increasing overall thickness of molded parts of such microplates have resulted in an undesirable increase in the thickness of sample well walls, such as UNI PCR 96-well plate available from Polyfiltronics, Inc. of Rockland, Mass., wherein the average sample well wall thickness is greater than or equal to 0.020 inches (0.5 mm).

Using currently available manufacturing methods, the requirements for robotic-compatible thin-well microplates are in direct conflict with the requirements for thin-well microplates for use in thermal cycling procedures. One known method of addressing this problem is to utilize a tray of a first material with sample wells separately created from a second material. Such microplates are commercially available are under the names of "Omni-Tube Plate" and "Thermo-Tube Plate", available from ABgene Ltd. of Surrey, UK. Both products consist of a tray, with overall dimensions approximating those of a multi-well plate, having an array of holes into which separately manufactured tubes or strips of tubes are loosely inserted. Because of the assembly required, these products do not offer the convenience of a single, unitary plate provided by a thin-well microplate. The high throughput nature of automated microplate processes inherently requires that manual intervention be minimized. Such a high throughput nature also precludes any preparatory or assembling steps, such as assembly of a sample vessel or microplate from various component parts. Further, the geometry and loosely fitting nature of these products does not lend these products to use with high-precision robotic equipment and automated dispensing equipment.

Therefore, it is desirable to provide a thin-well microplate as a single, unitary plate that is compatible for use with high-precision robotic handling equipment in automated procedures. A thin-well microplate that possesses the physical and material properties to maintain dimensional stability and integrity during robotic handling under the high temperature conditions of the thermal cycling procedures while also possessing properties that are conducive to thermal cycling reactions is also highly desirable.

SUMMARY OF THE INVENTION

Embodiments of the invention are directed to a thin-well microplate for use in research procedures and diagnostic techniques and to methods of manufacturing same. The thin-well microplate of the invention comprises a unitary plate of two separate components including a skirt and frame portion and a well and deck portion having a plurality of sample wells. Each portion is constructed as a separate component of a suitable material that is selected for the specific physical and material properties such material imparts to each component. The skirt and frame portion and the well and deck portion are joined to form the unitary plate. The combination of physical and material properties provided by the skirt and frame portion and the well and deck portion includes, although not limited to, thin-walled sample wells for adequate thermal transfer and physical stability to withstand high temperature conditions. The combination of physical and material properties provided by the skirt and frame portion and the well and deck portion optimizes the performance of the thin-well microplate with automated equipment in thermal cycling procedures.

In a first embodiment of the invention, a thin-well microplate includes a skirt and frame portion with a top surface having an plurality of holes arranged in a first array pattern and a well and deck portion joined to the top surface of the skirt and frame portion to form a unitary plate. The well and deck portion includes a plurality of sample wells integral with the deck and portion and arranged in the first array pattern such that the sample wells extend through the plurality of holes of the skirt and frame portion when the well and deck portion is joined with the skirt and frame portion to form the unitary plate. The skirt and frame portion is constructed of a first material that imparts rigidity to the skirt and frame portion to allow the thin-well microplate to be used with automated equipment. The well and deck portion is constructed of a second material that forms sample wells with thin walls of consistent thickness to allow adequate thermal transfer to the sample wells. The second material of construction further allows the thin-well microplate to be used with optical detection equipment due to sufficient opacity provided by the second material to the sample wells.

The unitary plate of the first embodiment includes the skirt and frame portion and the well and deck portion formed as separate components and then permanently joined to form the unitary plate. In another version of the first embodiment, the well and deck portion is formed integral with the top surface of the skirt and frame portion to form the unitary plate.

The skirt and frame portion includes four walls forming a bottom opposite the top surface, wherein the bottom has a length and width slightly larger than the length and width of the top surface. The skirt and frame portion further includes at least one indentation in each wall to allow engagement of automated equipment with the thin-well microplate.

The well and deck portion further includes a raised rim around an opening of each sample well that is contiguous with an upper surface of the well and deck portion. The raised rim forms grooves in the well and deck portion between adjacent sample wells to prevent contamination between sample wells.

In another embodiment of the invention, the well and deck portion includes an upper surface having a plurality of interconnecting links with individual links joining adjacent sample wells to form a meshwork of interconnecting links and sample wells. As described above, the well and deck portion including the meshwork of interconnecting links and sample wells may be formed as a separate component of the skirt and frame portion and then permanently joined to the skirt and frame portion to form the unitary plate. Alternatively, in a version of this embodiment, the meshwork may be formed integral with the top surface of the skirt and frame portion.

In still another embodiment of the invention, the thin-well microplate includes a skirt and frame portion, constructed of a first material, having a top surface with a plurality of holes arranged in a first array pattern, and walls of equal depth extending from the top surface. The skirt and frame portion further includes a plurality of sample wells, constructed of a second material, and arranged in the first pattern such that the sample wells extend through the plurality of holes in the top surface of the skirt and frame portion. In a version of this embodiment, the thin-well microplate includes a plurality of interconnecting links with individual links joining adjacent sample wells.

In the first embodiment, the first material used to construct the skirt and frame portion is, although not limited to, a polymer resin or a filled polymer resin. The filled polymer resin is capable of withstanding a temperature of at least 100° C. which allows the thin-well microplate to be used in thermal cycling procedures in which high temperatures are used. The skirt and frame portion in one version of the first embodiment is constructed of glass-filled polypropylene which imparts sufficient rigidity to the skirt and frame portion to allow the thin-well microplate to be used with automated equipment.

The second material used to construct the well and deck portion of the first embodiment is, although not limited to, a polymer resin or an unfilled polymer resin. The unfilled polymer resin is capable of withstanding a temperature of at least 100° C., which similarly allows the thin-well microplate to be used in high temperature thermal cycling procedures. However, the unfilled polymer resin not only withstands high temperature conditions of thermal cycling, but forms sample wells with thin walls of consistent thickness. In one version of this embodiment, the well and deck portion is constructed of an unfilled polypropylene which forms sample wells with thin walls to allow adequate thermal transfer to sample wells during thermal cycling procedures, and also provides sufficient opacity to the sample wells to allow use of optical detection equipment with the thin-well microplate.

The invention is also directed to methods of construction of the thin-well microplate. Methods of construction include in one embodiment a first method of construction wherein the thin-well microplate is formed as a unitary plate in a single molding process comprising two steps. The first method of construction includes providing a first material that is conducive to the molding process, and molding an insert of the first material in a first step, wherein the insert includes a plurality of holes formed in a top surface of the insert. The first method of construction further includes providing a second material that is conducive to the molding process, positioning the insert to receive the second material and applying the second material to the insert in a second step, wherein an over-mold is molded having a planar deck integrally formed with a top surface of the insert and a plurality of sample wells integrally formed with the top surface of the insert and the plurality of holes to produce the unitary plate.

In a version of this embodiment, the molding process is an injection molding process including the first step as a first injection molding of the first material and the second step as a second injection molding of the second material. In other versions of this embodiment, the first and second materials are polymer resins, or, alternatively, the first material is a glass-filled polypropylene and the second material is an unfilled polypropylene.

Another embodiment of the methods of construction includes a second method of construction, wherein the thin-well microplate is formed as a unitary plate in two separate manufacturing processes. The second method of construction includes providing a first material that is conducive to a first manufacturing process, forming a skirt and frame portion of the first material by the first manufacturing process, wherein the skirt and frame portion includes a plurality of holes formed in a top surface of the skirt and frame portion. The second method of construction further includes providing a second material that is conducive to a second manufacturing process and forming a well and deck portion of the second material by the second manufacturing process, wherein the well and deck portion includes a plurality of sample wells formed in a top planar deck of the well and deck portion that are sized for insertion into the plurality of holes of the skirt and frame portion. According to the second method of construction, the skirt and frame portion and the well and deck portion are joined after their separate manufacture such that the plurality of sample wells is disposed in the plurality of holes. The well and deck portion is permanently adhered to the top surface of the skirt and frame portion to produce the unitary plate.

In a version of the second method of construction of the thin-well microplate, the first and second manufacturing processes are not only separate processes, but different methods of construction. The first and the second manufacturing processes may be different methods of molding, for instance, wherein the first manufacturing process is a convention molding process and the second manufacturing process is an injection molding process. Alternatively, in another version of the second embodiment, the first and the second manufacturing processes are similar methods of manufacturing.

The second method of construction of the thin-well microplate allows the first and second manufacturing processes to each employ different materials of construction. Accordingly, another version of this embodiment includes, for instance, the first manufacturing process employing a glass-filled polypropylene to form the skirt and frame portion and the second manufacturing process employing an unfilled polypropylene to form the well and deck portion, thereby forming a unitary plate constructed of two different materials. Still another version of this embodiment of constructing the thin-well microplate in two separate manufacturing processes includes constructing the skirt and frame portion in the first manufacturing process of the first material that is a material other than a polymer resin, such as aluminum sheet stock, and constructing the well and deck portion in the second manufacturing process of the second material including an unfilled polypropylene.

Although the second method of construction of the thin-well microplate includes using different materials in each of two different or similar, but separate, processes, to construct the skirt and frame portion and the well and deck portions as separate components, the skirt and frame portion and the well and deck portion are thereafter permanently joined by adhering steps that may include, for instance, ultrasonic or thermal welding, to form the unitary plate of the invention.

BRIEF DESCRIPTION OF THE DRAWINGS

For a better understanding of the invention, reference is made to the drawings which are incorporated herein by reference and in which.

DETAILED DESCRIPTION OF THE INVENTION

Figure 1:
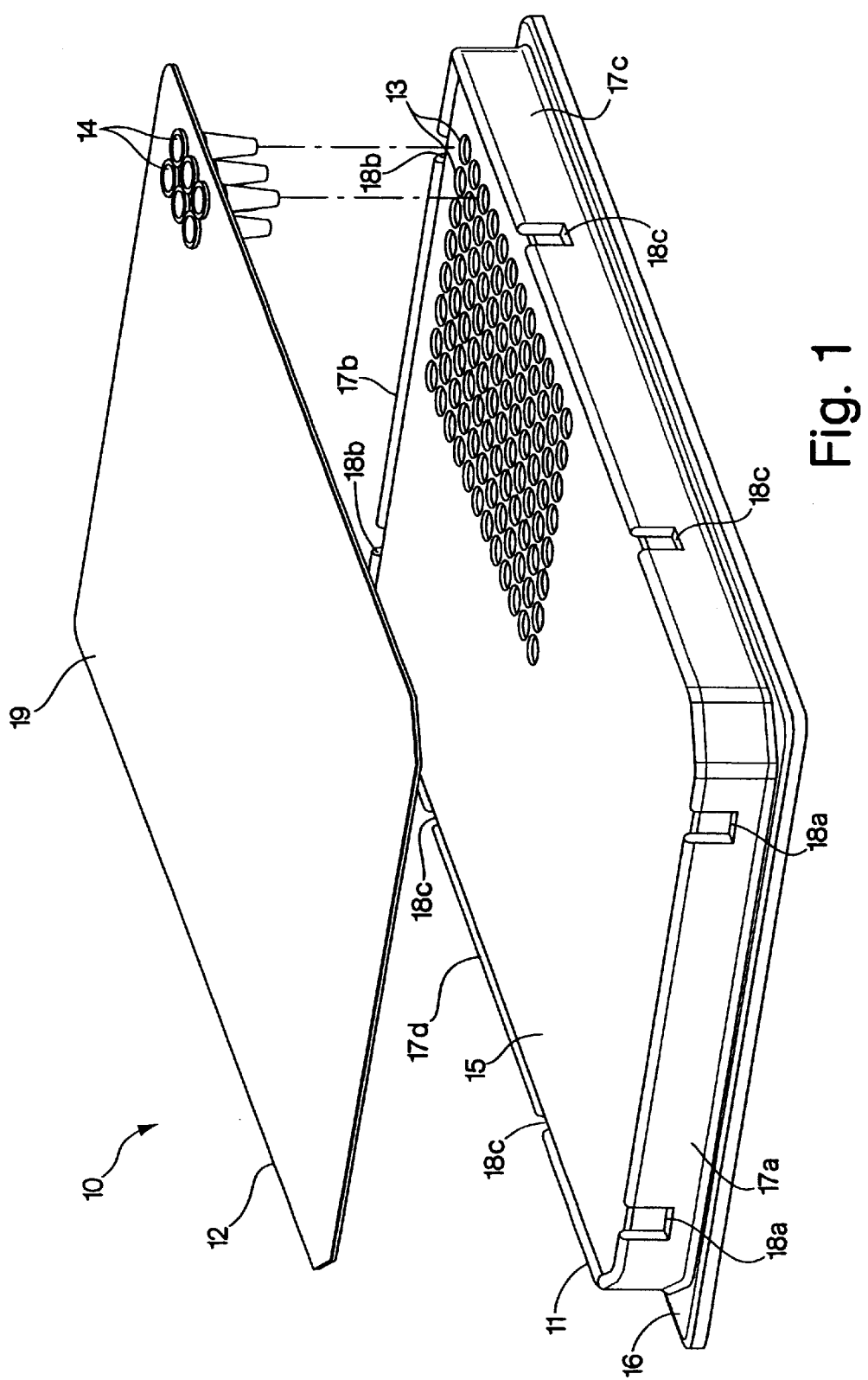
FIG. 1 is a perspective view of a thin-well microplate according to an embodiment of the invention.

Illustrative embodiments of the invention described below are directed to a thin-well microplate, and methods for manufacturing the same, for use in research procedures and diagnostic techniques that require or desire multiple samples for qualitative and quantitative analyses. More specifically, the invention is directed to a thin-well microplate with thin-walled sample wells and a specific combination of physical and material properties such that the microplate is particularly suited for use in thermal cycling procedures and with automated equipment. Those skilled in the art will appreciate, however, that embodiments of the invention are not limited to the thin-well microplate for use in thermal cycling applications, but, rather, may include the thin-well microplate for sample containment and storage for a variety of reactions and assays. The invention is also directed toward methods of constructing the thin-well microplate as a unitary plate with the specific combination of physical and material properties that are conducive for use with automated equipment and in thermal cycling procedures.

Embodiments of the invention will be described with reference to FIGS. 1–10 which are presented for the purpose of illustrating embodiments and are not intended to limit the scope of the claims.

Referring to FIGS. 1 and 2a–2c, a first embodiment of the invention includes a unitary thin-well microplate 10 including two joined components, a skirt and frame portion 11 and a well and deck portion 12 on the skirt and frame portion 11 to form the thin-well microplate 10. Depending upon methods of construction discussed below, the well and deck portion 12 is formed integral with the skirt and frame portion 11, or, alternatively, formed separately from the skirt and frame 11 and thereafter permanently assembled with the skirt and frame portion 11 to form the thin-well microplate 10 as a single unitary microplate.

The skirt and frame portion 11 includes a top rectangular planar surface 15 and a bottom 16. The top planar surface 15 is connected to the bottom 16 by four walls, including two end walls 17a, 17b and two side walls 17c, 17d. The top planar surface 15 has a length $L_1$ of about 122 mm, and a width $W_1$ of about 78 mm. The bottom 16, as formed by the end walls 17a, 17b, and side walls 17c, 17d, includes dimensions that are slightly larger than the dimensions of the top planar surface 15 to extend the bottom 16 beyond a perimeter of the top planar surface 15. The bottom 16 has a length $L_2$ of about 127 mm and a width $W_2$ of about 85 mm. The skirt and frame portion 11 of the first embodiment is rectangular in shape, although it is understood by those skilled in the art that the skirt and frame portion 11 is not limited to a specific shape and may include other shapes and overall dimensions.

The top planar surface 15 includes an array of holes 13 formed therein and integral with the top surface 15 to accommodate a corresponding array of sample wells, or a well-array. In the first embodiment illustrated in FIG. 1, the array of holes 13 (only part of which are shown) is arranged in a rectangular pattern that includes a total of 384 holes, arranged in an array of 16 by 24 holes capable of receiving a 384-well array of sample wells. In another embodiment, the top planar surface 15 may include the array of holes 13 with a total of 96 holes arranged in an array of 8 by 12 holes capable of receiving a 96-well array of sample wells. Although the array of holes 13 of the first embodiment illustrated in FIG. 1 is structured and configured to accommodate a 384-well array of sample wells, it is understood by those skilled in the art that the array of holes 13 in the top surface 15 may include any number of holes to accommodate well arrays of higher or lower sample well density, and may be arranged in alternative array patterns.

Figure 2A:
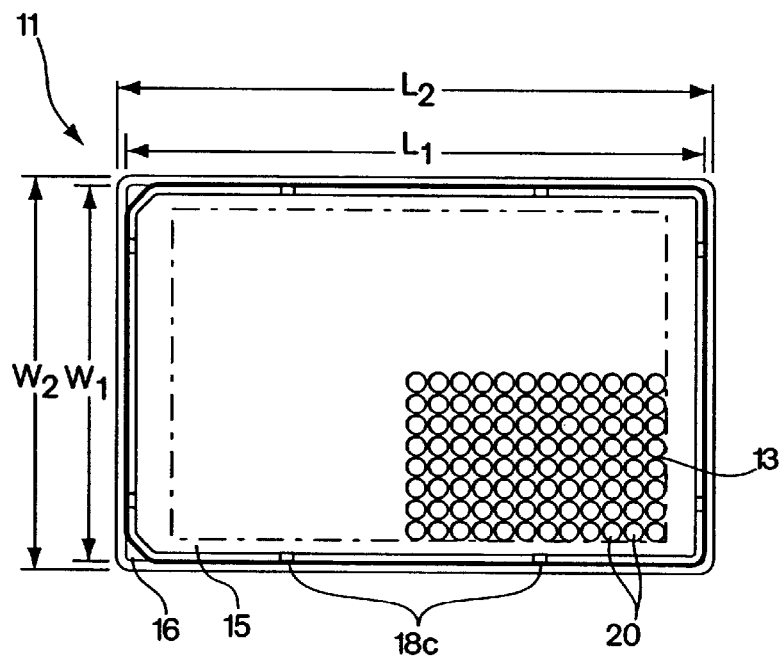
FIG. 2a is a top view of a skirt and frame portion of the microplate of FIG. 1.
Figure 2B:
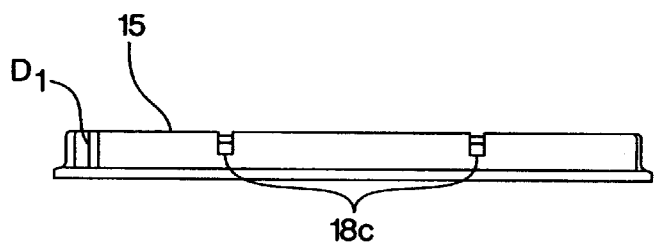
FIG. 2b is a side view of a side wall of the skirt and frame portion of the microplate of FIG. 1.
Figure 2C:
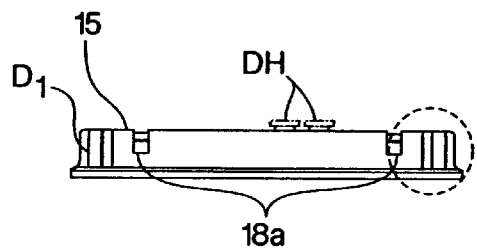
FIG. 2c is a side view of an end wall of the skirt and frame portion of the microplate of FIG. 1.

Referring to FIG. 2a, individual holes of the 384-hole array 13 have a circular opening 20 integral with the top planar surface 15. As shown in FIGS. 1 and 2a–2c, the end walls 17a, 17b of the skirt and frame portion 11 each include a pair of indented notches formed therein and referred to as index points 18a, 18b. Each of the side walls 17c, 17d similarly includes a pair of index points 18c, 18d formed therein. The pairs of index points 18a, 18b, 18c, 18d are structured and configured to receive engagement mechanisms of automated handling equipment, such as, but not limited to, a robotic arm, and help such engagement mechanisms to grip and transport the skirt and frame portion 11 and to facilitate accurate and consistent placement of the thin-well microplate 10 during the automated phases of liquid sample handling procedures. In the first embodiment illustrated in FIGS. 2a–2c, the pairs of index points 18a, 18b, 18c, 18d are rectangular shaped, although they are not limited to a particular shape or configuration and may include other geometries and shapes necessary to receive engagement mechanisms of automated equipment.

The skirt and frame portion 11 of the thin-well microplate 10 is constructed of a suitable material that imparts and optimizes the physical and material properties of strength and rigidity to the skirt and frame portion 11, as well as straightness to the top planar surface 15 and bottom 16. In addition to structural strength, rigidity and straightness, a suitable material of construction imparts dimensional stability to the skirt and frame portion 11 and resists shrinkage and distortion of the physical geometry and the overall dimensions that may result from exposure to high temperatures of thermal cycling processes during use. A suitable material of construction also substantially resists deformation of the skirt and frame portion 11 caused by gripping and holding of engagement mechanisms of automatic handling equipment, such as a robotic arm, with the skirt and frame portion 11.

A suitable material of construction of the skirt and frame portion 11 includes, but is not limited to, a polymer resin, such as a glass-filled polypropylene including, for example, AMCO #PP1015G glass-filled polypropylene available from AMCO International, Inc. of Farmingdale, N.Y. AMCO #PP1015G glass-filled polypropylene has a standard melting point of approximately 170° C. and is substantially resistant to excessive softening due to cyclic exposure to high temperatures of thermal cycling processes, typically about 80° C. to about 96° C., and often up to about 100° C. Filled polypropylene possesses suitable flow characteristics, e.g.: melt flow of 4–8 g/min, that render such material conducive to manufacturing the skirt and frame portion 11 by various molding processes described herein. Filled polymers minimize or eliminate the need to add other physical mechanisms, such as strengthening ribs, to the skirt and frame portion 11 to enhance strength and rigidity. While it is desirable to mold the skirt and frame portion 11 of a glass filled polypropylene it should be noted that other filled polymers may be utilized to produce acceptable results. Examples of these are various families of filled polypropylenes, for instance 20% to 40% talc filled or 40% to 60% calcium carbonate filled, all available from AMCO International, Inc. Further examples of acceptable polymers include several of those in the amorphous polymer family, such as glass filled polycarbonate.

Referring to FIGS. 1, 3a–3c, the well and deck portion 12 of the thin-well microplate 10 includes a rectangular planar deck 19 with a top surface 30 and a bottom surface 31. The planar deck 19 has a length $L_3$ of about 119.93 to about 120.03 mm, and a width $W_3$ of about 78.33 mm to about 78.43 mm. The planar deck 19 of the first embodiment is rectangular in shape, although it is understood by those skilled in the art that the invention is not limited to the planar deck 19 of a specific shape and may include other shapes and overall dimensions.

The planar deck 19 includes an array of sample wells 14 formed integral with the planar deck 19. The array of sample wells 14 is arranged in a rectangular pattern and includes a number and pattern of sample wells that corresponds to the number and pattern of the array of holes 13 of the skirt and frame portion 11 such that the array of sample wells 14 is coupled with the array of holes 13 of the skirt and frame portion 11. The array of sample wells 14 of the first embodiment illustrated in FIG. 1 includes a total of 384 sample wells 14 arranged in an array of 16 by 24 sample wells 14. In another embodiment, the planar deck 19 includes the array of sample wells 14 with a total of 96 sample wells arranged in an array of 8 by 12 sample wells 14. In the first embodiment, the center-to-center spacing between individual sample wells 14 is about 4.5 mm.

Although the 384-well array of sample wells 14 is illustrated in FIG. 1, it is understood by those skilled in the art that the planar deck 19 may include sample well arrays 14 of higher or lower well density as well as arrays of sample wells configured in alternative patterns. The center-to-center is preferably maintained at about 9 mm or some integral fraction or multiple thereof to allow the use of standard automated equipment for processing samples, as such standard equipment is designed for 9 mm center-to-center spacing of sample wells. When other automated equipment is used the center-to-center spacing may be different to conform with such equipment.

Figure 3A:
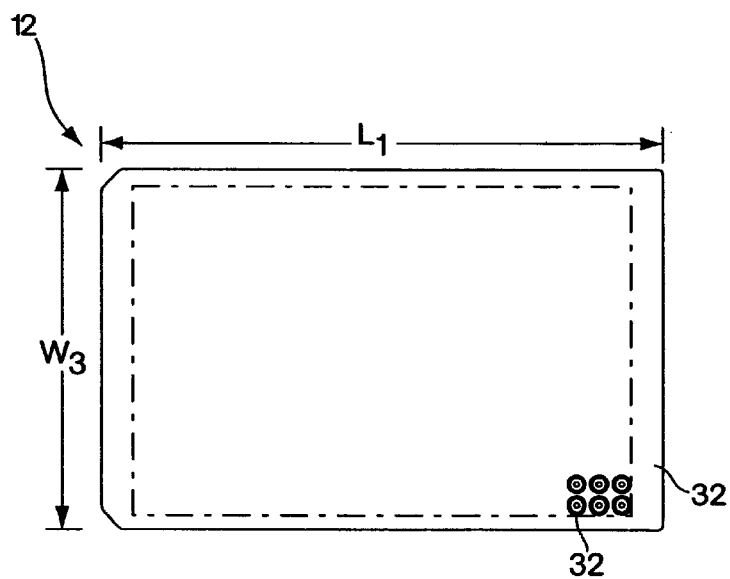
FIG. 3a is a top view of a well and deck portion of the microplate of FIG. 1.
Figure 3B:
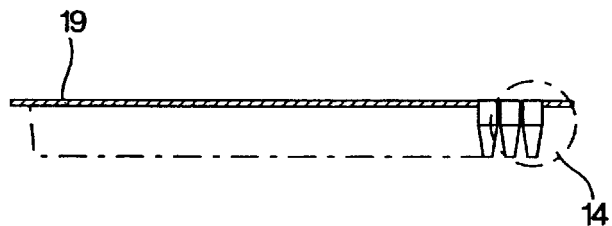
FIG. 3b is a side view of the well and deck portion of the microplate of FIG. 1.
Figure 3C:
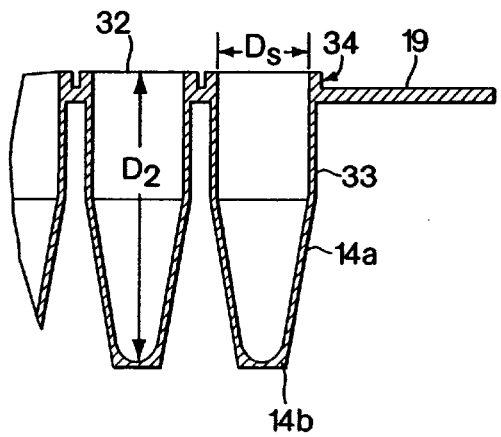
FIG. 3c is a cross-sectional side view of an array of sample wells of the microplate of FIG. 1.

As shown in FIGS. 3a and 3c, individual sample wells 14 of the first embodiment include an opening 32 in the top surface 30 of the planar deck 19 having a diameter $D_S$ of about 3.12 mm to about 3.22 mm. Individual sample wells 14 are sized for insertion or formation into individual holes 13 of the array of holes 13 in the skirt and frame portion 11. Individual sample wells 14 include a well body 33 that extends downwardly from the opening 32 and a raised rim 34 surrounding each well opening 32. The raised rim 34 creates a recessed area between adjacent sample wells 14 to reduce the possibility of contamination between wells. The sample well body 33 is conically-shaped and has a depth $D_2$ of about 15.5 mm. Side walls 14a of the conically-shaped well body 33 angle inward about 17.1° to about 17.9° and narrow to a diameter of about 1.66 mm to about 1.76 mm. Although the first embodiment of sample wells 14 illustrated in FIGS. 3a–3c include the shape and dimensions described above, it is understood by those skilled in the art that the samples wells may include other shapes and dimensions.

Figure 4:
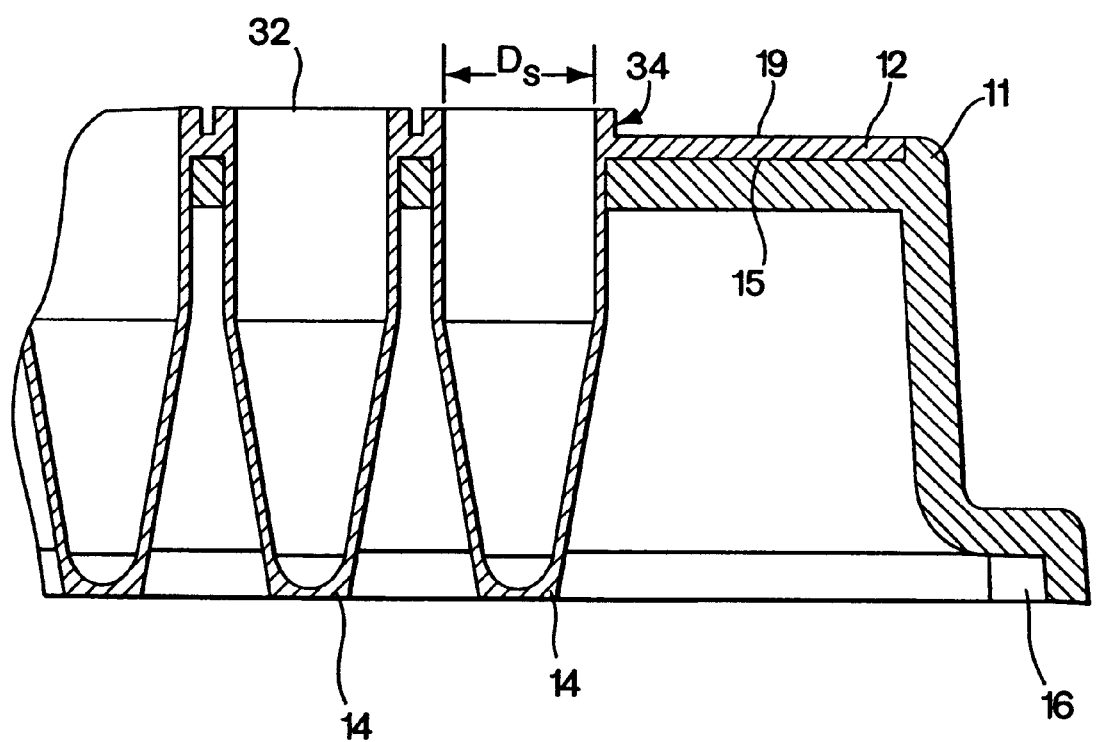
FIG. 4 is a cross-sectional side view of the array of sample wells disposed on the skirt and frame portion.

The side walls 14a of individual sample wells 14 are thin, having a thickness of, although not limited to, about 0.15 mm to about 0.25 mm. Individual sample wells 14 have a flat, thin bottom wall 14b having a thickness of, although not limited to, about 0.15 mm to about 0.25 mm. When the well and deck portion 12 is engaged with or integral to the skirt and frame portion 11, as illustrated in FIG. 4, the lower portion of walls 14a of the array of sample wells 14 can be in intimate contact with wells of a heating/cooling block of a thermal cycler device used during thermal cycling to expose samples to heat. The thin nature of the sample well walls 14a and the bottom walls 14b helps to facilitate adequate thermal transfer to samples contained within the sample wells 14.

A suitable material of construction of the well and deck portion 12 includes, but is not limited to, a polymer resin, such as a virgin, unfilled polypropylene including, for example, FINA #3829 polypropylene, available from AMCO International, Inc. of Farmingdale, N.Y. FINA #3829 polypropylene has a standard melting point of approximately 170° C. FINA #3829 polypropylene possesses a high melt flow rate, such as 6 g/min, which renders such material conducive to construction by various molding processes described herein. In addition, the FINA family of polypropylenes possess high deflection temperatures enabling such material to withstand high temperatures of thermal cycling.

The skirt and frame portion 11 is constructed of a first suitable material that imparts and maintains during thermal cycling procedures the physical and material properties of opacity, strength and rigidity. The well and deck portion 12 is constructed of a second suitable material that permits the sample well walls 14a and 14b to be thinly constructed of a thickness of about 0.15 mm to about 0.38 mm. A suitable material of construction also reduces or eliminates variation in well wall thickness throughout the sample well body 33 and between individual sample wells 14 during manufacture of the well and deck portion 12. The use of separate materials for the skirt and frame portion 11 and the well and deck portion 12 of microplate 10 allows optimization of production processes not possible when molding multi-well plates of a single resin in one operation. Thus, the multi-well microplate 10 is less susceptible to warping after thermal cycling. In addition, the construction of microplate 10 allows for use a suitable material for well and deck portion 12 that is compatible with biomolecules and possesses good clarity to allow optical analysis of samples, while allowing for use of a suitable material for skirt and deck portion 11 that may not be biocompatible or optically clear but may possess the properties of strength, rigidity and stability.

Figure 5:
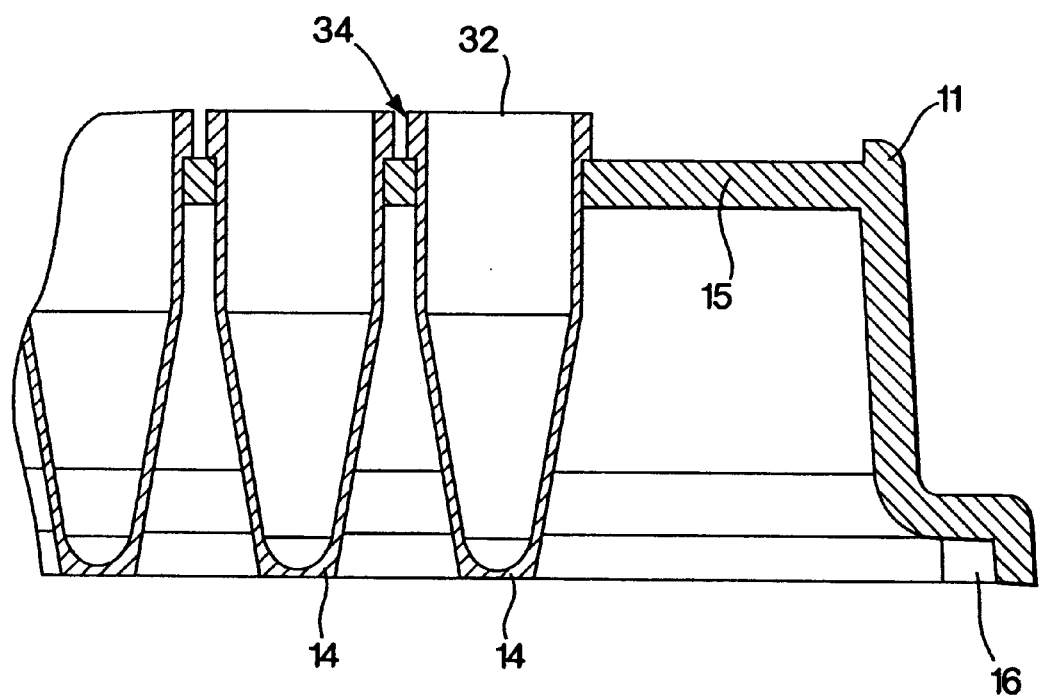
FIG. 5 is a cross-sectional side view of the array of sample wells of a second embodiment of the invention.

Referring to FIG. 5, in a second embodiment of the invention, the array of sample wells 14 is formed without the planar deck 19 acting as a connecting structure between individual sample wells 14. Rather, sample wells 14 are formed as independent and separate wells integral with the skirt and frame portion 11 without any connection means between adjacent sample wells.

Figure 6:
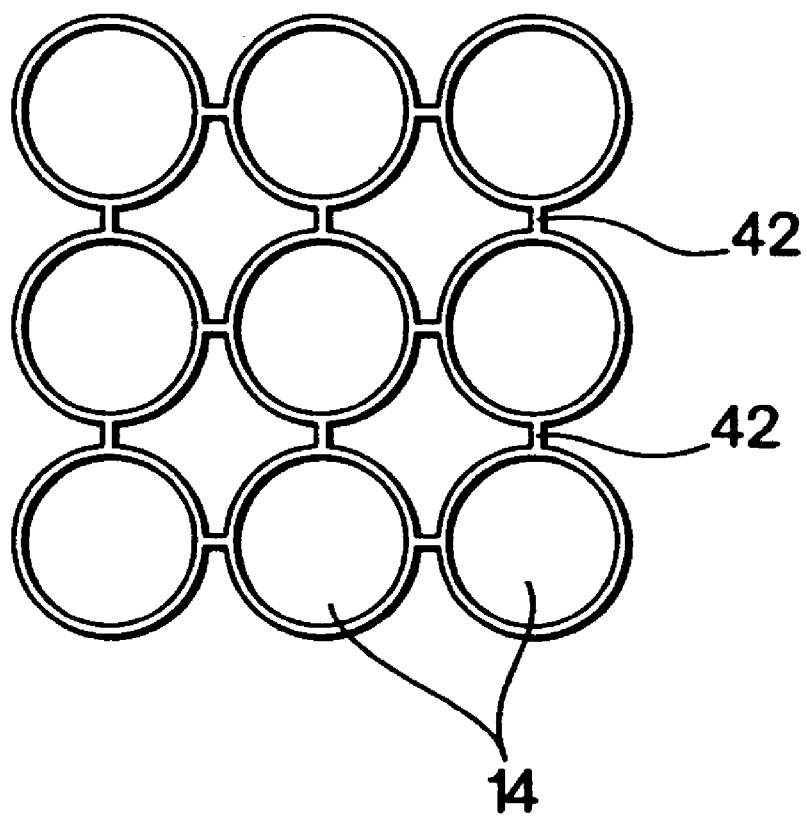
FIG. 6 is a top view of the array of sample wells of a third embodiment of the invention.

Referring to FIG. 6, in a third embodiment of the invention, the array of sample wells 14 is similarly formed without the planar decks 19 and 15 but with interconnecting links 42 between. adjacent sample wells 14, forming a meshwork of links 42 that acts as a connecting means between individual sample wells 14. In this embodiment, the meshwork of links 42 and interconnected sample wells 14 is fabricated to or formed into the skirt and frame portion 11.

The thin-well microplate 10 of the invention and methods of making same described below simultaneously combine many desirable features thus providing several advantages over prior art microplates. The thin-well microplate 10 possesses the physical and material properties that render the microplate 10 capable of withstanding high temperature conditions of thermal cycling procedures and conducive for use with automated equipment, particularly robotic handling instruments. The thin-well microplate 10 also maintains a compatibility with standard automated liquid handling equipment, such as the Hydra™ dispensing system available from Robbins Scientific of Sunnyvale, Calif., for introducing and removing sample mixtures from sample wells. The sample wells 14 of the thin-well microplate 10 are relatively thin, on the order of 0.25 mm or less, which helps facilitate optimal thermal transfer to samples during thermal cycling procedures. In addition, the thickness of sample well walls 14a, 14b permits use of optical detection systems for optically analyzing samples through sample well bottoms.

Methods of construction of the thin-well microplate 10 of the invention include manufacturing the skirt and frame portion 11 and the well and deck portion 12 separately, either by different steps of a single manufacturing process or by separate manufacturing operations. Such methods of construction provide the advantage of constructing each portion of an ideal material that will impart and maintain the optimal physical and material properties required and desired of the thin-well microplate 10. The invention provides the thin-well microplate 10 with a specific combination of physical and material properties including strength, rigidity, and straightness of the skirt and frame portion 11 to withstand manipulation by automated equipment; dimensional stability and integrity of the skirt and frame portion 11 and the well and deck portion 12 during and following exposure to the high temperatures of thermal cycling procedures; substantial flatness of the array of sample wells 14 for accurate and reliable handling of liquid samples; and thin-walled sample wells 14 to help optimize thermal transfer and to permit optical analysis. Prior art methods of constructing thin-well microplates do not use materials or processes that produce thin-walled multi-well microplates that possess the combination of specific physical and material properties of the present invention.

Figure 7:
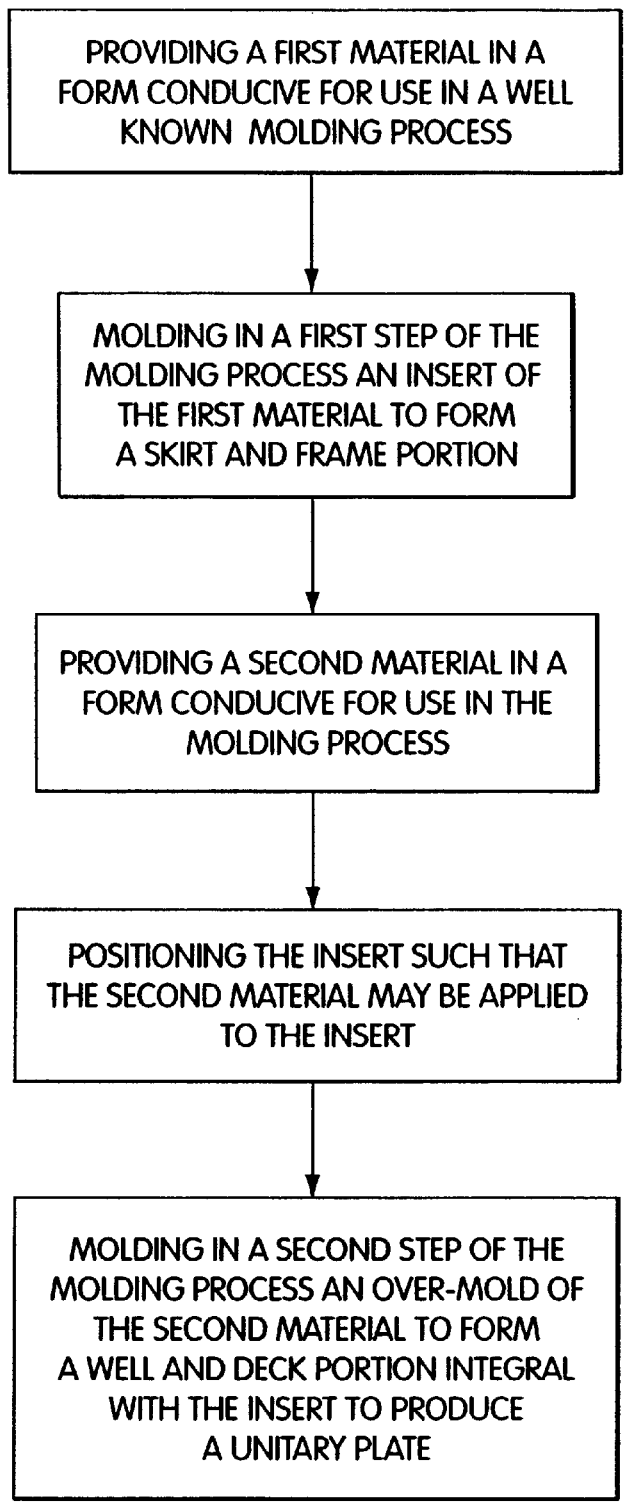
FIG. 7 is a process flow diagram illustrating a first method of construction of a microplate of the present invention.

The present invention also includes methods for forming the thin-well microplate having the properties of the invention. A first method for constructing the thin-well microplate 10 includes manufacturing the thin-well microplate 10 by a single process, wherein the well and deck portion 12 is formed integral with the skirt and frame portion 11. Each portion of the thin-well microplate 10 is manufactured of a separate material and by a separate step of the same process to produce a unitary plate. Referring to FIG. 7, a two-step molding process includes providing a suitable first material in a form conducive for use in a well known molding process 410. In a first step of the molding process 420, the skirt and frame portion 11 is molded of the first material as an insert. A suitable second material is provided in a form conducive for use in the well known molding process 430. The insert or the skirt and frame portion 11 is subsequently positioned to receive an application of the second material 440. In a second step of the well known molding process 450, the well and deck portion 12 is molded integral with the skirt and frame portion 11 of the second suitable material as an over-mold, producing a unitary plate.

Figure 8:
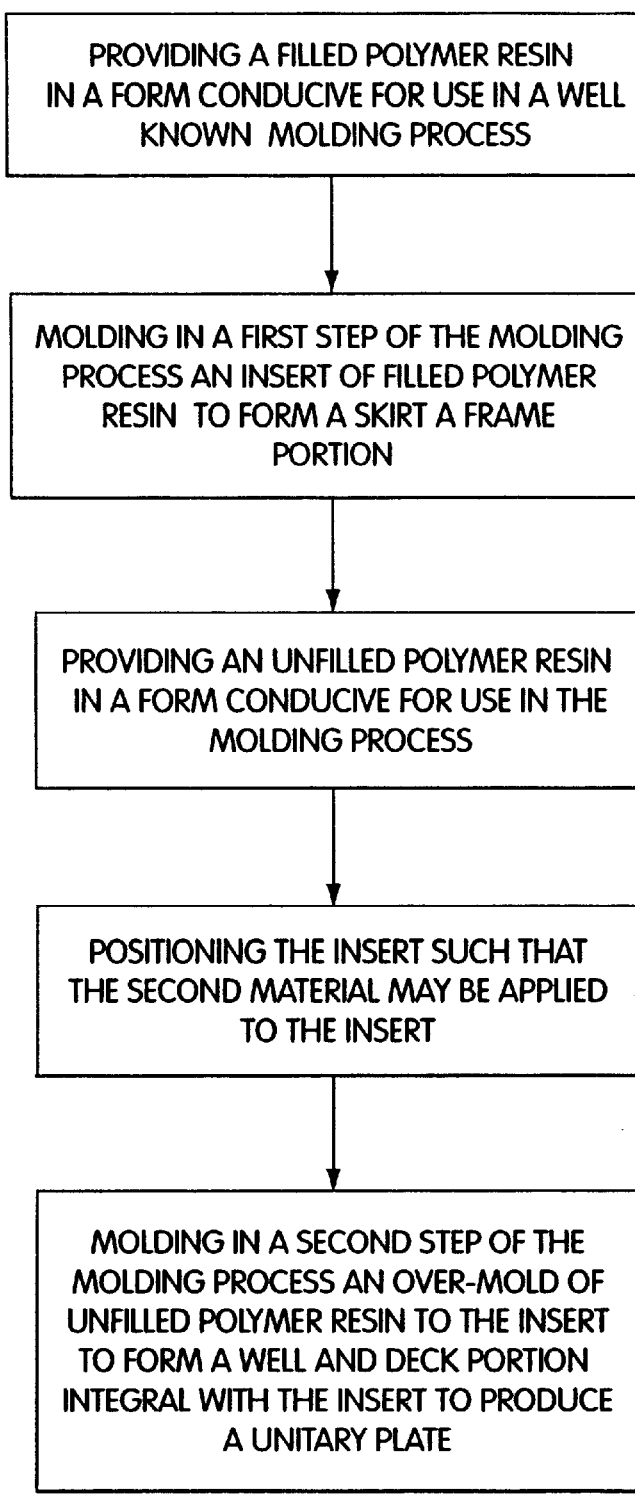
FIG. 8 is a process flow diagram illustrating an embodiment of the first method of construction.

Referring to FIG. 8, a specific embodiment of the first method of construction of the thin-well microplate, includes manufacturing the thin-well microplate 10 by a two-step molding process well known to those skilled in the art including initially providing a first material, such as, but not limited to, a filled polymer resin, in a form conducive for use with a well known molding process 510. In a first step of the well known molding process 520, an insert is molded of the filled polymer resin, to form the skirt and frame portion 11. A second material is provided, such as, but not limited to, an unfilled polymer resin, in a form conducive for use in the well known molding process 530. In a second step 540 of the well known molding process, the unfilled polymer resin is applied to the insert as an over-mold to form the well and deck portion 12, producing a unitary plate. The insert or skirt and frame portion 11 acts as a skeleton over which the over-mold or the well and deck portion 12 is integrally formed.

A second embodiment of the first construction method includes manufacturing the well and deck portion 12 integral with the skirt and frame portion 11 by a single two-step injection molding process well known to those skilled in the art. Such a process is described in Injection Molding, Vol. 8, No. 4, Part 1 of 2, April 2000 Edition. The two-step injection molding process may be performed by using various commercially available injection molding presses that are design for two-step molding processes, such as the SynErgy 2C press available from Netstal-Maschinen AG of Naefels, Switzerland or Netstal-Machinery, Inc. of Devens, Mass. The two-step injection molding technique uses a single mold and includes forming the skirt and frame portion 11 of the first material by a first shot injection molding in a first step. The well and deck portion 12 is subsequently constructed of the second material by a second shot injection into the same mold in a second step forming the array of sample wells 14 as well as filling an area surrounding the sample wells openings 32 to form the planar deck 19.

Figure 9:
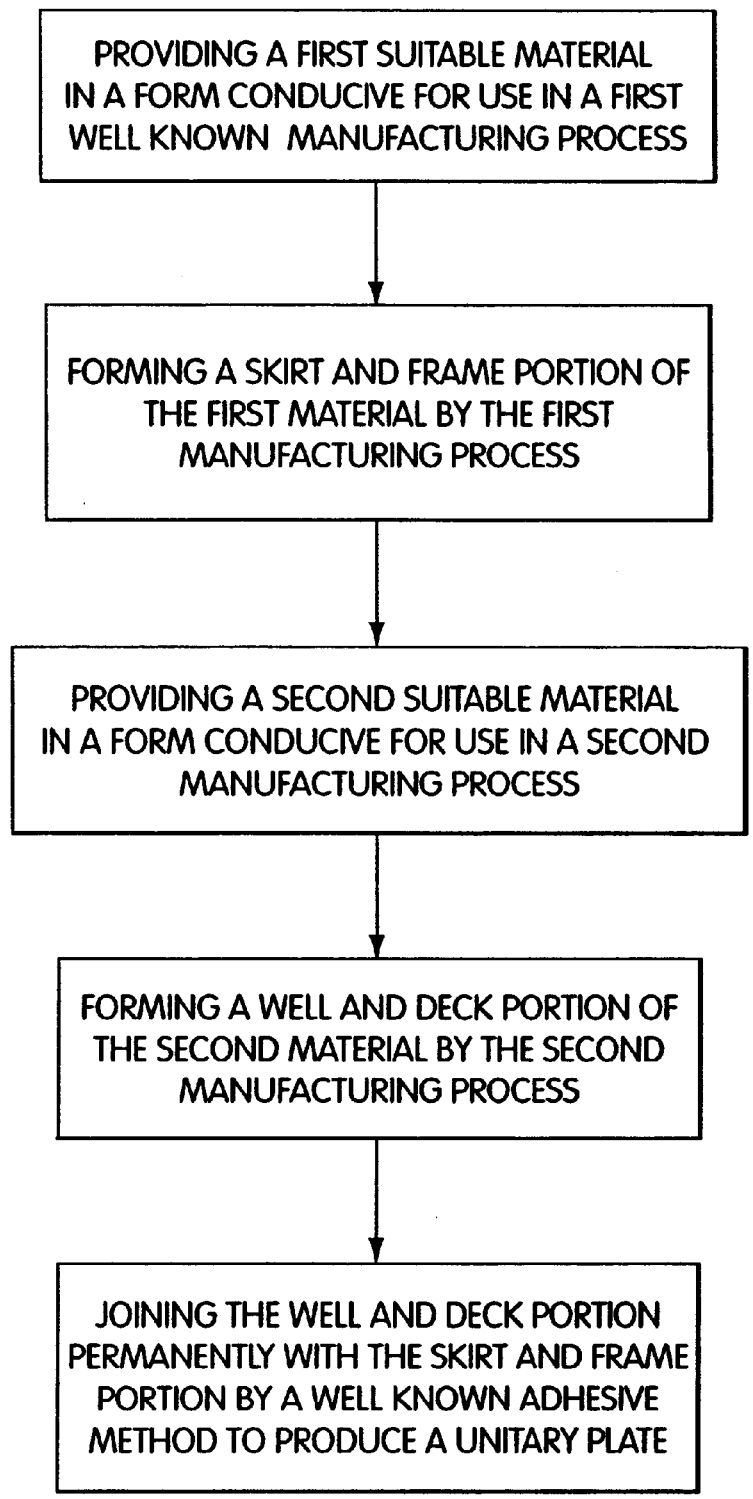
FIG. 9 is a process flow diagram illustrating a second method of construction of a microplate of the present invention.

A second method of construction of the thin-well microplate 10 includes forming the skirt and frame portion 11 and the well and deck portion 12 by two separate manufacturing processes of separate materials of construction. Referring to FIG. 9, in a first manufacturing process well known to those skilled in the art, a first suitable material is provided in a form conducive to the first manufacturing process 610. The skirt and frame portion 11 is formed of the first material by the first manufacturing process 620. A second suitable material is provided in a form conducive to a second manufacturing process well known to those skilled in the art 630. A well and deck portion 12 is formed of the second material by the second manufacturing process 640. The skirt and frame portion 11 and the well and deck portion 12 are thereafter permanently joined by an adhesive method well known to those skilled in the art, such as ultrasonic welding or thermal welding, producing a unitary plate 650. The first and second manufacturing processes may be different manufacturing processes or similar processes performed separately.

Figure 10:
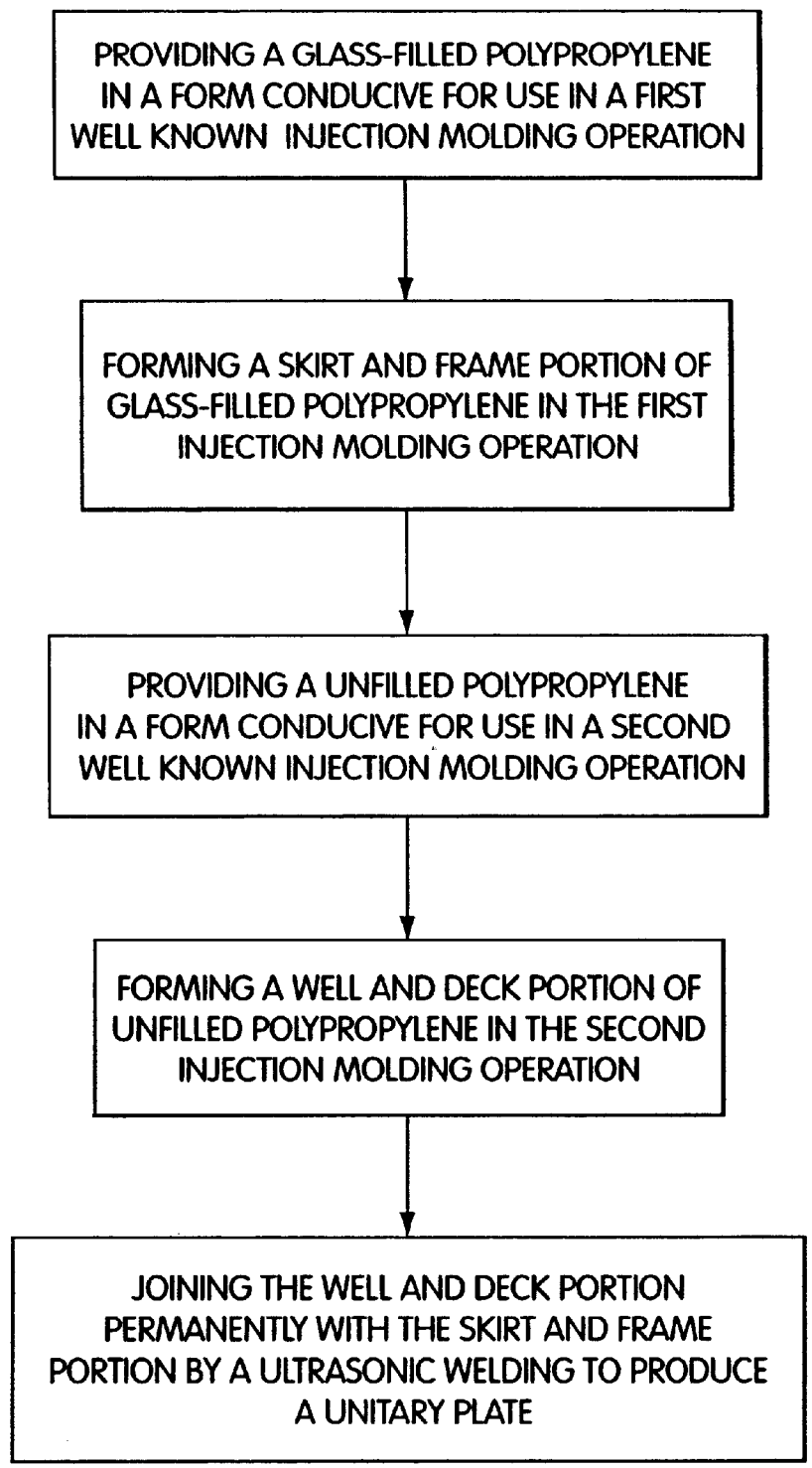
FIG. 10 is a process flow diagram illustrating an embodiment of the second method of construction.

Referring to FIG. 10, a version of the second method of construction includes forming the skirt and frame portion 11 and the well and deck portion 12 by separate injection molding processes or operations. A first suitable material, such as a filled polymer resin including glass-filled polypropylene, is provided in a form conducive to a first injection molding process 710.

The skirt and frame portion 11 is molded of glass-filled polypropylene by the first injection molding operation 720. A second suitable material is provided, such as, but not limited to, an unfilled polymer resin including unfilled polypropylene 730. The well and deck portion 12 is constructed in a second and separate injection molding manufacturing process of unfilled polypropylene 740. The skirt and frame portion 11 and the well and deck portion 12 are thereafter permanently joined by ultrasonic welding to produce a unitary plate 750. Ultrasonic welding may be performed by using ultrasonic welding equipment available from Herrmann Ultrasonics, Inc. of Schaumburg, Ill.

In another version of the second method of construction, the thin-well microplate 10 is constructed by two separate methods of construction with each portion manufactured by separate processes using alternative materials of construction. For instance, the skirt and frame portion 11 is constructed of a material other than a polymer resin that similarly imparts and maintains the optimal physical and material properties desired of the skirt and frame portion 11. Such an alternative material may include, but is not limited to, aluminum sheet stock. The skirt and frame portion 11 is initially formed of aluminum sheet stock in a first process by either a stamping or electromagnetic forming method well known to those skilled in the art. The skirt and frame portion 11 is then positioned in an injection mold in a second process, wherein the well and deck portion 12 is constructed of a polymer resin, such as unfilled polypropylene, by an over-molding process that forms the array of sample wells 14 and the planar deck 19 over the skirt and frame portion 11.

Having thus described at least one illustrative embodiment of the invention, various alterations, modifications and improvements will readily occur to those skilled in the art. Such alterations, modifications and improvements are intended to be within the scope and spirit of the invention. Accordingly, the foregoing description is by way of example only and is not intended as limiting. The invention's limit is defined only in the following claims and the equivalents thereto.

What is claimed is:

1. A method of constructing a thin-well microplate comprising steps of:

providing a first material in a form conducive for use in a two-step molding process;

molding an insert of the first material in a first step of the molding process, wherein the insert includes a plurality of holes formed in a top surface of the insert;

providing a second material in a form conducive for use in the molding process;

positioning the insert to receive the second material;

applying the second material to the insert; and molding an over-mold of the second material by a second step of the molding process, wherein the over-mold is a planar deck and a plurality of sample wells integrally formed with the top surface of the insert and the plurality of holes to produce a unitary plate.

2. The method of construction of the thin-well microplate of claim 1, wherein the first material is a polymer resin and the second material is a polymer resin.

3. The method of construction of the thin-well microplate of claim 2, wherein the first material is a glass-filled polypropylene and the second material is an unfilled polypropylene.

4. The method of construction of the thin-well microplate of claim 2, wherein the molding process is a two-step injection molding process.

5. A method of constructing a thin-well microplate comprising steps of:

providing a first material in a form conducive for use in a first manufacturing process;

forming a skirt and frame portion of the first material by the first manufacturing process, wherein the skirt and frame portion includes a plurality of holes formed in a top planar surface of the skirt and frame portion;

providing a second material in a form conducive for use in a second manufacturing process;

forming a well and deck portion of the second material by the second manufacturing process, wherein the well and deck portion includes a plurality of sample wells formed in a top planar deck of the well and deck portion and sized for insertion into the plurality of holes of the skirt and frame portion; and joining the well and deck portion to the skirt and frame portion such that the plurality of sample wells are disposed in the plurality of holes; and adhering the well and deck portion permanently to the top surface of the skirt and frame portion to produce a unitary plate.

6. The method of constructing the thin-well multiplate of claim 5, wherein the first and the second manufacturing processes are different methods of manufacturing.

7. The method of constructing the thin-well multiplate of claim 5, wherein the first and the second manufacturing processes are similar methods of manufacturing.

8. The method of constructing the thin-well multiplate of claim 5, wherein the first and the second manufacturing process each include a molding process.

9. The method of constructing the thin-well multiplate of claim 8, wherein the molding process is an injection molding process.

10. The method of constructing the thin-well multiplate of claim 5, wherein the first material is a polymer resin and the second material is a polymer resin.

11. The method of constructing the thin-well multiplate of claim 10, wherein the first material is a glass-filled polypropylene and the second material is an unfilled polypropylene.

12. The method of constructing the thin-well multiplate of claim 5, wherein the first material is a material other than a polymer resin and the second material is a polymer resin.

13. The method of constructing the thin-well multiplate of claim 5, wherein the adhering step includes ultrasonic welding.

14. The method of constructing the thin-well multiplate of claim 5, wherein the adhering step includes thermal welding.

* * * * *

UNITED STATES PATENT AND TRADEMARK OFFICE
CERTIFICATE OF CORRECTION

PATENT NO.    : 6,528,302 B2
DATED         : March 4, 2003
INVENTOR(S)   : Turner et al.

It is certified that error appears in the above-identified patent and that said Letters Patent is hereby corrected as shown below:

Column 10,
Line 22, replace "surface 3 1." with -- surface 31. --;

Column 12,
Line 2, replace "42 between. adjacent" with -- 42 between adjacent --;

Column 14,
Line 66, replace "of claim 2," with -- of claim 1, --.

Signed and Sealed this

Twenty-seventh Day of July, 2004

JON W. DUDAS
*Acting Director of the United States Patent and Trademark Office*